United States Patent [19]

Löher

[11] Patent Number: 5,595,144
[45] Date of Patent: Jan. 21, 1997

[54] DEVICE FOR SORTING ANIMALS

[75] Inventor: Ulrich Löher, Oelde, Germany

[73] Assignee: Westfalia Separator Aktiengesellschaft, Oelde, Germany

[21] Appl. No.: 436,259

[22] PCT Filed: Apr. 13, 1994

[86] PCT No.: PCT/EP94/01915

§ 371 Date: May 11, 1995

§ 102(e) Date: May 11, 1995

[87] PCT Pub. No.: WO95/05735

PCT Pub. Date: Mar. 2, 1995

[30] Foreign Application Priority Data

Aug. 26, 1993 [DE] Germany .......................... 43 28 666.6

[51] Int. Cl.⁶ .................................................. A01K 29/00
[52] U.S. Cl. .......................................................... 119/840
[58] Field of Search ................... 119/51.02, 511, 119/840, 841, 842

[56] References Cited

U.S. PATENT DOCUMENTS 5,183,008  2/1993  Carrano .................................. 119/840

FOREIGN PATENT DOCUMENTS 2053343  2/1981  United Kingdom ................... 119/840
8704898  8/1987  WIPO .................................... 119/840

Primary Examiner—Robert P. Swiatek
Attorney, Agent, or Firm—Sprung Horn Kramer & Woods

[57] ABSTRACT

A device for sorting animals has a first electronic sensor for scanning animals, at least one downstream gate swingable back and forth in accordance with indicators that identify the animals detected by the first sensor to provide alternating access to one of at least two exits, and an entrance upstream of the at least one swingable gate. The entrance opens and closes in response to animal-identification indicators detected by a second sensor.

6 Claims, 1 Drawing Sheet

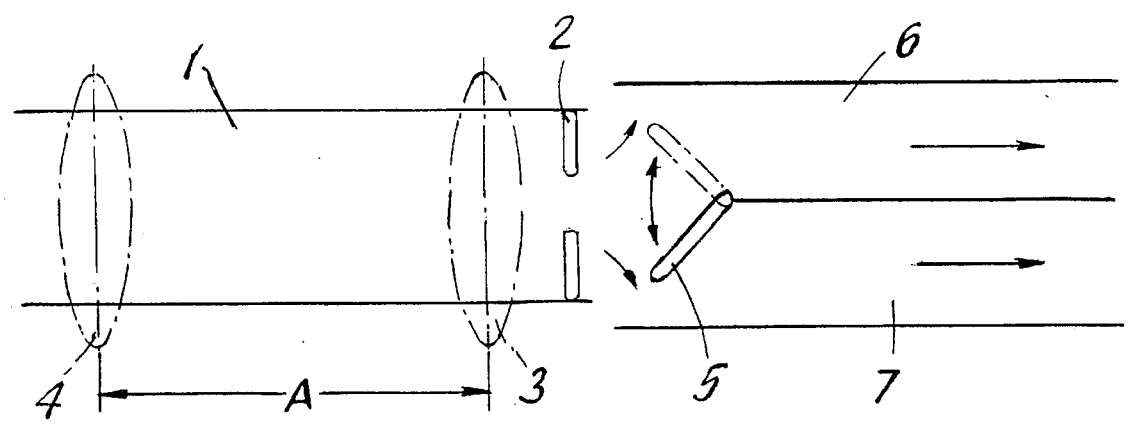

DEVICE FOR SORTING ANIMALS

BACKGROUND OF THE INVENTION

The invention concerns a device for sorting animals. The animals are scanned by an electronic sensor. A downstream gate swings back and forth in accordance with indicators that identify the animals and are detected by the sensor, providing alternating access to one of at least two exits.

A device of this genus is known from EP 0 499 428 A1. The number of animals traveling through the device has to be controlled to prevent one or more from traveling through too rapidly for the gate to handle and accordingly contaminating the process.

SUMMARY OF THE INVENTION

The object of the present invention is a device of the same genus that will ensure rapid and reliable sorting of even a powerful press of animals.

This object is attained by an entrance upstream of the swinging gate. The entrance opens and closes in response to animal-identification indicators detected by an additional sensor.

The entrance is initially closed and does not open when an arriving animal is scanned by the first sensor until access to the associated exit has been provided. The result is reliable sorting. The entrance remains open as long as the second sensor indicates that animals with the same indicators are traveling through the device, and closes when different indicators are detected. Since the entrance closes only occasionally, more animals can travel through in the same time.

The second sensor should be positioned at a sufficient distance upstream of the first sensor and in the vicinity of the entrance to ensure that the entrance closes at the proper time. That distance is at least 2 meters in one practical version. It should not, however, exceed 8 meters.

One practical embodiment of the device includes several swinging gates and associated exits, allowing the animals to be sorted into more than two groups.

The preliminary command for opening and closing the entrance can also derive from other areas that accommodate animals, the instantaneous coverage of a milking system for example.

One embodiment of the present invention will now be specified with reference to the accompanying drawing, which comprises a single FIGURE.

BRIEF DESCRIPTION OF THE DRAWING

The FIGURE is a top View of a device according to the present invention.

DETAILED DESCRIPTION OF THE INVENTION

The device for sorting animals illustrated in the FIGURE includes an intake 1 with an entrance 2 and two sensors 3 and 4. Sensors 3 and 4 are separated by a distance A, which ranges between 2 and 8 meters. Downstream of entrance 2 is an animal-sorting gate 5 that alternately opens and closes exits 6 and 7.

Second sensor 4 identifies an animal entering intake 1 and compares the data with those of the previously identified animal. Entrance 2 remains open as long as the data are identical and closes when an animal with a different indicator is detected. This animal is then identified by first sensor 3, which initiates an appropriate repositioning of sorting gate 5. Only then will entrance 2 open again and remain open until second sensor 4 detects an animal exhibiting a different indicator. At this stage the animals can travel rapidly through the device without entailing any risk of incorrect sorting. Once all the animals have been sorted out into another area of the accommodation, the preliminary command can be initiated from that area to change the state of entrance 2.

I claim:

1. A device for sorting animals, comprising: a first electronic sensor for scanning animals; at least one downstream gate swingable back and forth in accordance with indicators that identify the animals detected by the first sensor to provide alternating access to one of at least two exits, and an entrance upstream of the at least one swingable gate and opening and closing in response to animal-identification indicators detected by second sensor.

2. The device as in claim 1, wherein the second sensor is positioned at a sufficient distance A upstream of the first sensor and in the vicinity of the entrance to ensure that the entrance closes at the proper time.

3. The device as in claim 2, wherein the distance is at least 2 meters.

4. The device as in claim 2, wherein the distance does not exceed 8 meters.

5. The device as in claim 1, comprising several swingable gates with associated exits.

6. The device as in claim 1, wherein the second sensor is located in various areas that accommodate animals.

* * * * *